United States Patent
Windham

(10) Patent No.: US 10,139,652 B2
(45) Date of Patent: Nov. 27, 2018

(54) EYELUMINATORS

(71) Applicant: Randy Lee Windham, Keno, OR (US)

(72) Inventor: Randy Lee Windham, Keno, OR (US)

( * ) Notice: Subject to any disclaimer, the term of this patent is extended or adjusted under 35 U.S.C. 154(b) by 0 days.

(21) Appl. No.: 15/782,822

(22) Filed: Oct. 12, 2017

(65) Prior Publication Data

US 2018/0107027 A1    Apr. 19, 2018

Related U.S. Application Data

(60) Provisional application No. 62/408,671, filed on Oct. 14, 2016.

(51) Int. Cl.
| | | |
|---|---|---|
| *G02B 11/04* | (2006.01) | |
| *G02C 11/04* | (2006.01) | |
| *F21V 21/084* | (2006.01) | |

(52) U.S. Cl.
CPC ............ *G02C 11/04* (2013.01); *F21V 21/084* (2013.01)

(58) Field of Classification Search
CPC ....... A61F 2/16; G02B 27/0178; G02B 11/04; G02C 5/101; G02C 11/04; G02C 11/10; G02C 5/001; G02C 5/008; F21V 21/008; F21V 21/084; F21V 21/0885; F21V 21/0464; F21Y 2101/00; F21Y 2103/10; F21Y 2105/10

See application file for complete search history.

(56) References Cited

U.S. PATENT DOCUMENTS

| | | | | |
|---|---|---|---|---|
| 4,254,451 A | * | 3/1981 | Cochran, Jr. ...... | A44C 15/0015 315/323 |
| 5,224,772 A | * | 7/1993 | Fustos ..................... | B63C 11/12 2/428 |
| 5,353,378 A | * | 10/1994 | Hoffman ................ | G02C 11/10 704/258 |
| 5,946,071 A | * | 8/1999 | Feldman ................ | G02C 11/04 351/158 |
| 6,554,444 B2 | * | 4/2003 | Shimada ................. | F21L 15/14 362/103 |
| 6,824,265 B1 | * | 11/2004 | Harper ................... | G02C 11/04 351/158 |
| 6,857,739 B1 | * | 2/2005 | Watson .................. | G02C 11/04 351/158 |
| 6,966,668 B2 | * | 11/2005 | Cugini .................... | F21L 14/00 362/103 |
| 6,997,552 B1 | * | 2/2006 | Hung ...................... | G02C 11/02 351/158 |

(Continued)

*Primary Examiner* — Hargobind S Sawhney
(74) *Attorney, Agent, or Firm* — RG Patent Consulting, LLC; Rachel Gilboy

(57) ABSTRACT

Eyeluminators will provide the illumination needed when working in dim or dark places. They are basically state-of-the-art flashlights for your eyes! When the LED lights in the frames of these glasses are switched on, the user will have bright light wherever they look, and without the inconvenience of having to hold a flashlight and eliminating shadows caused by any other light source. Tiny LED light bulbs are embedded across the top of the frames of these glasses, with the power switches located on the earpieces. They have cushioned nose pads and frames to provide greater comfort when wearing them for extended periods of time. When the lights are switched on, bright light will illuminate whatever is in front of the person's face, so they have a very clear view ahead and shadows will not be a hindrance.

20 Claims, 5 Drawing Sheets

(56) References Cited

U.S. PATENT DOCUMENTS

| | | | | |
|---|---|---|---|---|
| 7,566,139 B1* | 7/2009 | Dority | ............... | F21V 21/084 |
| | | | | 362/103 |
| 8,235,524 B2* | 8/2012 | Waters | ............... | G02C 11/04 |
| | | | | 351/111 |
| 8,317,320 B2* | 11/2012 | Huang | ................ | A61H 5/00 |
| | | | | 351/158 |
| 9,033,534 B2* | 5/2015 | Borden | .............. | G02C 11/04 |
| | | | | 362/103 |
| 9,229,227 B2* | 1/2016 | Border | ........... | G02B 27/0093 |
| 2010/0110368 A1* | 5/2010 | Chaum | ............ | G02B 27/017 |
| | | | | 351/158 |
| 2010/0182563 A1* | 7/2010 | Waters | ............ | F21V 21/084 |
| | | | | 351/158 |
| 2016/0363787 A1* | 12/2016 | Blum | ................ | G02C 5/008 |

* cited by examiner

EYELUMINATORS

CROSS-REFERENCE TO RELATED APPLICATION

The present application is related to and claims priority from prior provisional application Ser. No. 62/408,671, filed Oct. 14, 2016 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of eyewear devices and more specifically relates to an improved pair of glasses comprising LED lights incorporated into the frames structured and arranged to have the lights be switched on when doing tasks having poor illumination, so work can progress and workers will have both hands free to accomplish their jobs.

2. Description of the Related Art

While working in the pipe welding trade, workers often find the need for additional and or more direct lighting to be able to see what they doing. It is next to impossible to hold a flashlight in one hand and to accomplish a task or work using the other, when we all know that two hands are usually needed for almost anything that we do, so a worker will try various methods to secure a flashlight or other types of lighting in the direction needed. A flashlight or other types of lighting in a fixed position is usually in the way and will cast unwanted shadows on the work site.

Glasses, also known as eyeglasses or spectacles, are devices consisting of glass or hard plastic lenses mounted in a frame that holds them in front of a person's eyes, typically using a bridge over the nose and arms which rest over the ears. Glasses are typically used for vision correction, such as with reading glasses and glasses used for nearsightedness. Safety glasses provide eye protection against flying debris for construction workers or lab technicians; these glasses may have protection for the sides of the eyes as well as in the lenses. Some types of safety glasses are used to protect against visible and near-visible light or radiation. Glasses are worn for eye protection in some sports, such as squash. Glasses wearers may use a strap to prevent the glasses from falling off during movement or sports. Wearers of glasses that are used only part of the time may have the glasses attached to a cord that goes around their neck, to prevent the loss of the glasses Therefore, a need exists for a specially designed device that will cast light exactly where it is needed when it is needed without any annoying shadows. The time-saving factor of this product is immense. This will be appreciated greatly by all of those working as construction tradesmen, as well as mechanics, law enforcement, emergency personnel, the military, and many other professionals, or just around the house.

Various attempts have been made to solve problems found in eyewear devices art. Among these are found in: U.S. Pat. No. 6,997,552 to Ming-Chi Hung; U.S. Publication No. 2004/0057229 to Scott Thomas; U.S. Pat. No. 6,824,265 to Wesley Stephen Harper; U.S. Pat. No. 8,235,524 to Michael Waters; and U.S. Pat. No. 6,966,668 to Cugini et al. This prior art is representative of illuminated eyewear devices.

Ideally, an improved pair of glasses should be user-friendly and safe in-use and, yet should operate reliably and be manufactured at a modest expense. Thus, a need exists for an improved pair of glasses comprising LED lights incorporated into the frames structured and arranged to have the lights be switched on when doing tasks having poor illumination, so work can progress and workers will have both hands free to accomplish their jobs and to avoid the above-mentioned problems.

BRIEF SUMMARY OF THE INVENTION

In view of the foregoing disadvantages inherent in the known eyewear devices art, the present invention provides an Improved Pair of Glasses (entitled Eyeluminators). The general purpose of the present invention, which will be described subsequently in greater detail is to provide an improved pair of glasses comprising LED lights incorporated into the frames structured and arranged to have the lights be switched on when doing tasks having poor illumination, so work can progress and workers will have both hands free to accomplish their jobs.

An improved pair of glasses comprising: a main frame including a top bar portion, two rim portions, a bridge portion, and two temple portions; two lens members; at least one light member; at least one power source; and a power switch member. The top bar portion is adapted to be positioned above and across a pair of eyes of a user. The two rim portions are attached to a bottom portion of the top bar portion, are spaced from one another, and are adapted to surround respective eyes of the pair of eyes of the user. The bridge portion is connected between edge portions of the two rim portions, and is adapted to rest upon a nose of the user. Wherein each of the two temple portions includes an earpiece portion on a distal end thereof adapted to be placed around a respective ear of a user.

Wherein the two temple portions are respectively attached at proximal ends thereof to edge portions of respective two rim portions. Wherein the two lens members are respectively placed within the releasably connected to the two rim portions and adapted to cover the respective eyes of said pair of eyes of the user. Wherein the at least one light member is attached to a top portion of the top bar portion and adapted to shine light in a forward direction of the user. Wherein the at least one power source is attached to the main frame and electrically connected to and adapted to power said at least one light member. Wherein the power switch member is attached to one of the two temple portions, is electrically connected to and between the power source and the at least one light member, and is adapted to allow a user to turn on and off said at least one light member.

The present invention holds significant improvements and serves as an Improved Pair of Glasses. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, an Improved Pair of Glasses (entitled Eyeluminators), constructed and operative according to the teachings of the present invention.

The various embodiments of the present invention will hereinafter be described in conjunction with the appended drawings, wherein like designations denote like elements.

DETAILED DESCRIPTION

Figure 1:
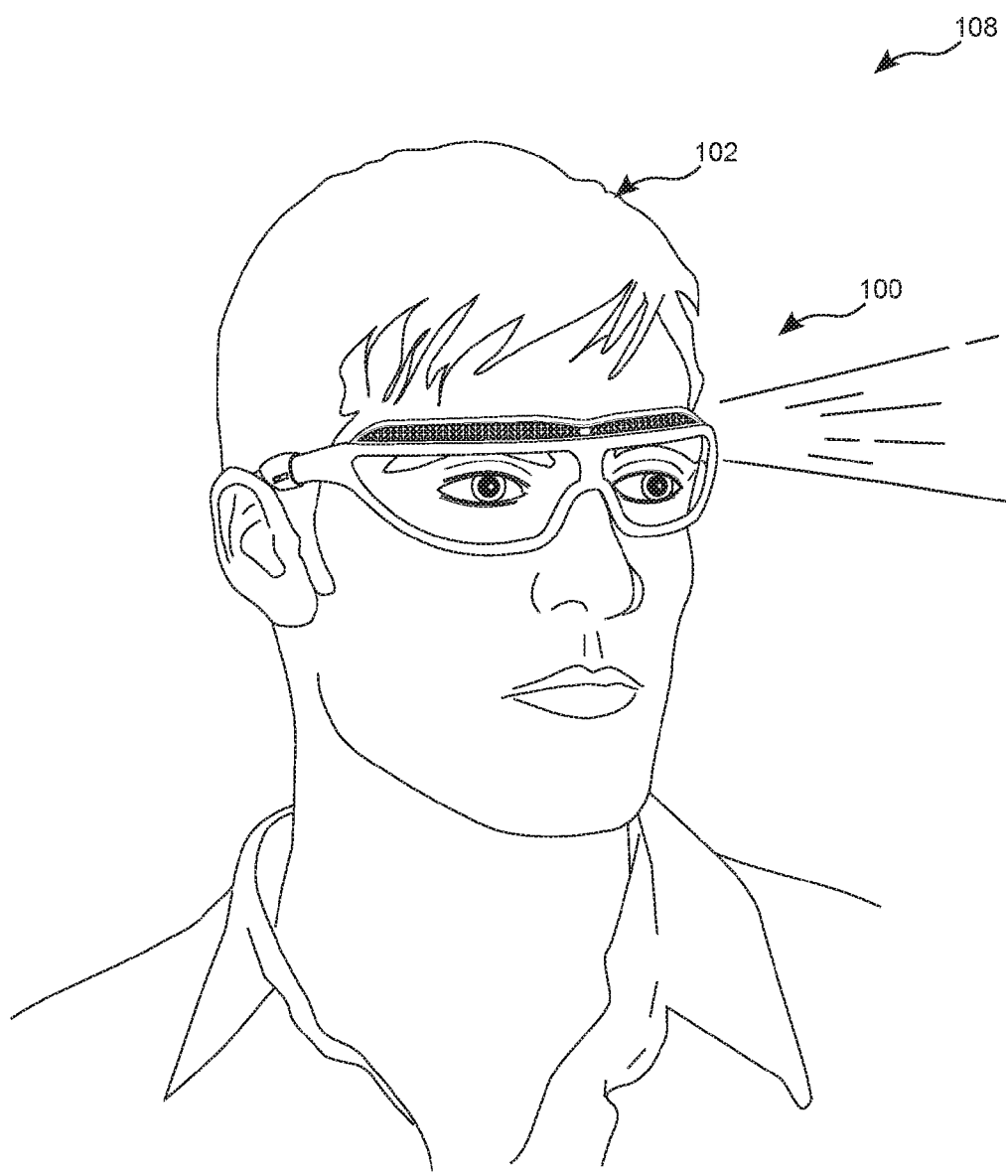
FIG. 1 shows a perspective view illustrating an Improved Pair of Glasses in an in-use condition according to an embodiment of the present invention.
Figure 2:
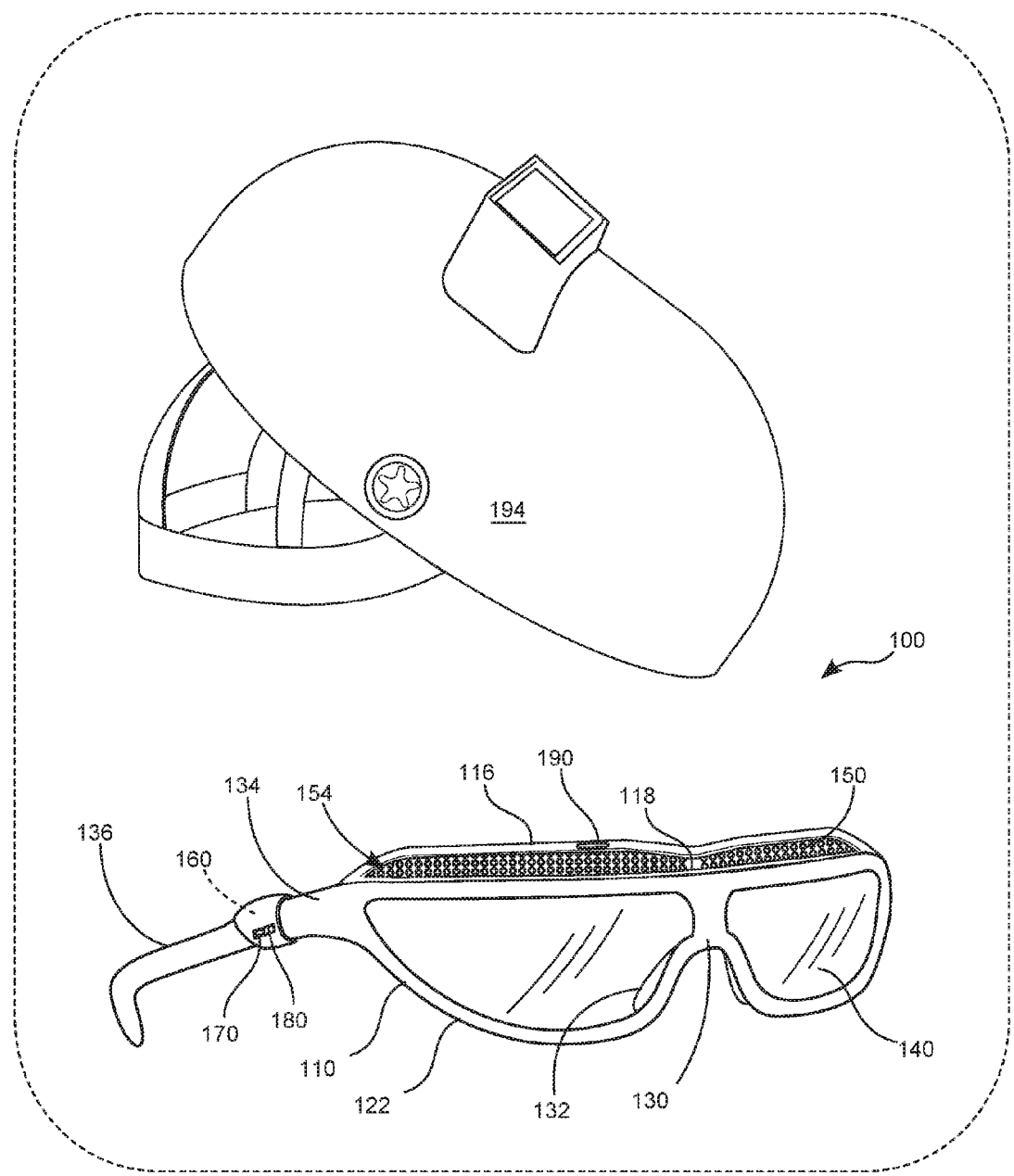
FIG. 2 shows a perspective view illustrating an Improved Pair of Glasses according to an embodiment of the present invention.

As discussed above, embodiments of the present invention relate to an eyewear device and more specifically relates to an Improved Pair of Glasses (entitled Eyeluminators) comprising LED lights incorporated into the frames structured and arranged to have the lights be switched on when doing tasks having poor illumination, so work can progress and workers will have both hands free to accomplish their jobs.

Generally speaking, the Eyeluminators will provide the illumination needed when working in dim or dark places. They are basically state-of-the-art flashlights for your eyes! When the LED lights in the frames of these glasses are switched on, the user will have bright light wherever they look, and without the inconvenience of having to hold a flashlight and eliminating shadows caused by any other light source. Tiny LED light bulbs are embedded across the top of the frames of these glasses, with the power switches located on the earpieces. They have cushioned nose pads and frames to provide greater comfort when wearing them for extended periods of time. When the lights are switched on, bright light will illuminate whatever is in front of the person's face, so they have a very clear view ahead and shadows will not be a hindrance.

These glasses will be useful for everyone, when working around the house, when hunting or camping, and when working on vehicles, RVs, boats, etc. The lenses in the frames can be replaced when and if they become scratched. These lenses may be available with different degrees of magnification, making it easier for older workers and those with vision difficulties to see details better when wearing them.

A separate battery pack can be available, to provide the power needed so the lights will continue to shine during long work sessions. A specially-designed version for welders would have a sensor, so when the welder's hood goes down, the lights will go off and come back on when the hood is lifted up. This will prevent the glare of the lights reflecting from the welding lens, which interferes with the welder having a clear view while he is doing his welding. The lights may be on an adjustable bar, so that it can be rotated up or down, to focus the lights better in certain situations. These glasses will be available in a variety of colors and possibly a couple of different camouflage patterns, to appeal to both men and women buyers.

The unique features of this product will provide the following benefits for consumers everywhere:
  Convenient, hands-free lighting to make it easier to do tasks when the available lighting is inadequate or non-existent
  The light will shine in the direction a person is looking, and will cast a shadow-free, bright light directly onto the work site
  The time-saving factor that this product presents is more valuable than anyone can imagine
  Workers hands will be unimpeded, not having to hold a flashlight or other lighting at an awkward angle that will cast shadows
  Will be an invaluable aid for older workers, who have greater difficulty seeing details as they age Referring now to FIGS. 1-4, showing perspective views illustrating improved pair of glasses 100 according to an embodiment of the present invention of FIG. 1.

Figure 4:
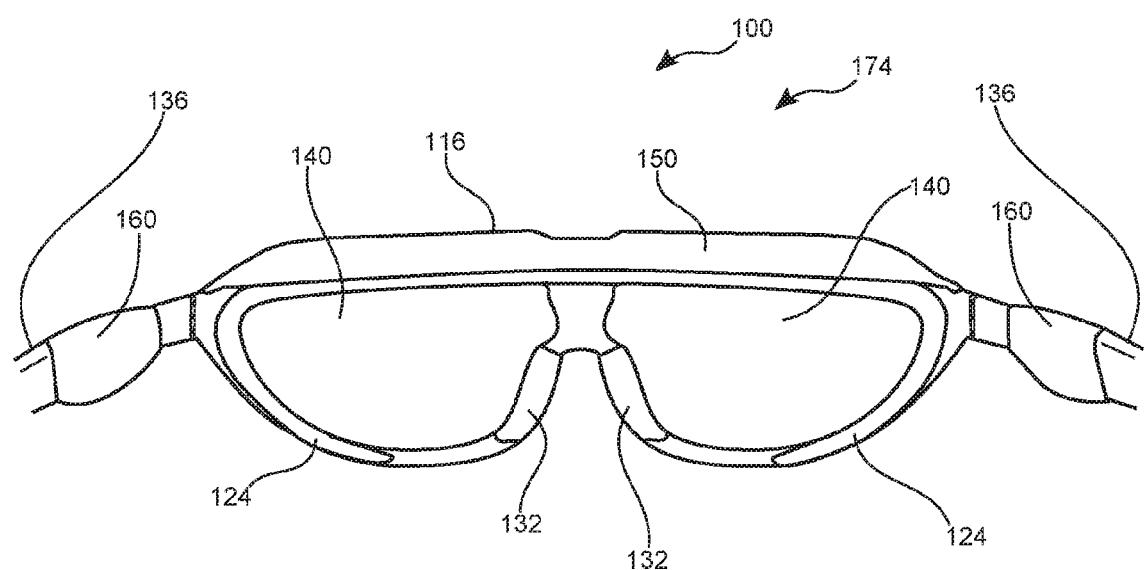
FIG. 4 shows a perspective view illustrating an Improved Pair of Glasses according to an embodiment of the present invention. (Show lens being interchangeable)
Figure 5:
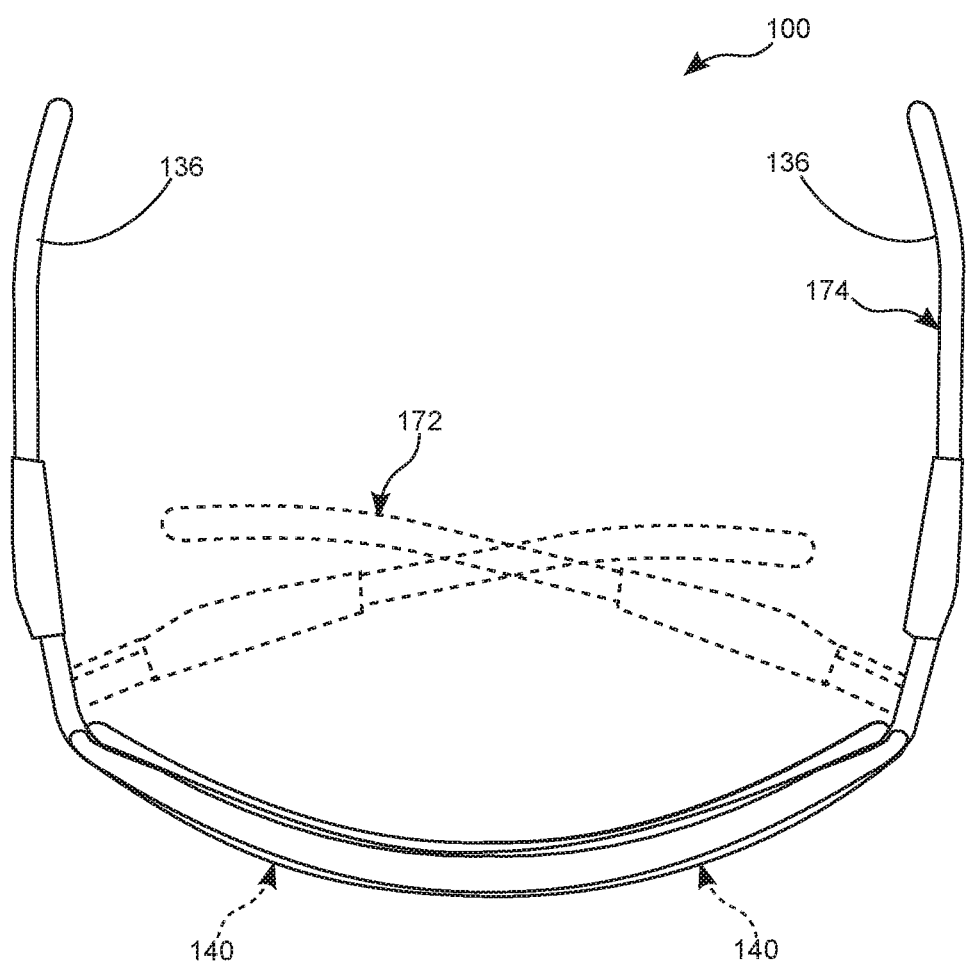
FIG. 5 shows another perspective view illustrating the Improved Pair of Glasses according to an embodiment of the present invention.

An improved pair of glasses 100 comprising: main frame 110 including top bar portion 116, two rim portions 122, bridge portion 130, and two temple portions 134; two lens members 140; at least one light member 150; at least one power source 160; and power switch member 170. Top bar portion 116 is adapted to be positioned above and across pair of eyes 104 of user 102 as shown in in-use condition 108 of FIG. 1. Two rim portions 122 are attached to a bottom portion of the top bar portion, are spaced from one another, and are adapted to surround respective eyes of pair of eyes 104 of user 102. Improved pair of glasses 100 further comprising two rim pads 124 respectively attached to two rim portions 122 and adapted to provide padding between each rim portion 122 and the face of user 102. Bridge portion 130 is connected between edge portions of two rim portions 122, and is adapted to rest upon nose 106 of user 102. Improved pair of glasses 100 further comprising at least one nose pad 132 attached to bridge portion 130 and adapted to provide padding between bridge portion 130 and nose 106 of user 102.

Wherein each of two temple portions 134 includes earpiece portion 136 on a distal end thereof adapted to be placed around a respective ear of user 102. Two temple portions 134 are pivotally attached at proximal ends thereof to edge portions of respective two rim portions 122. Wherein two temple portions 134 are respectively attached at proximal ends thereof to edge portions of respective two rim portions 122.

Wherein the two lens members 140 are respectively placed within the releasably connected to two rim portions 122 and adapted to cover the respective eyes of pair of eyes 104 of user 102. Wherein main frame 110 and two lens members 140 are formed from a high impact plastic material. Wherein the high impact plastic material is rated to ANSI-Z87-1.2010 standard. Wherein two lens members 140 are formed to have a chosen degree of magnification. Improved pair of glasses 100 further comprising plurality of pairs of lens members 144 each adapted to be releasably connected to respective two rim portions 122, such that plurality of pairs of lens members 144 are interchangeable; and wherein each pair of plurality of pairs of lens members 144 are formed having differing degrees of magnification as shown in FIG. 4.

Wherein at least one light member 150 is attached to top portion 118 of top bar portion 116 and adapted to shine light in a forward direction of user 102. At least one light member 150 is formed as a light emitting diode. At least one light member 150 is formed as a plurality light emitting diodes forming elongated strip of light emitting diodes 154. At least one light member 150 is pivotally and adjustably attached to top portion 118 of top bar portion 116 and adapted to shine light in variable forward directions of user 102. Wherein there are two of at least one light members 150, are spaced from one another upon top bar portion 116, and are located respectively above respective two rim portions 122. Two light members 150 are formed as a plurality light emitting diodes forming an elongated strip of light emitting diodes 154. Two light members 150 are pivotally and adjustably attached to top portion 118 of top bar portion 116 and each adapted to shine light in variable forward directions of user 102.

Wherein at least one power source 160 is attached to main frame 110 and electrically connected to and adapted to power at least one light member 150. Power source 160 is formed as at least one battery member 162. At least one battery member 162 may comprise at least one rechargeable battery. The rechargeable battery will include at least one charging cord to recharge battery member 162 as needed.

Improved pair of glasses 100, further comprising dimmer control member 180 attached to one of two temple portions 134, is electrically connected to and between power source 160 and at least one light member 150, and is adapted to allow user 102 to control the brightness of at least one light member 150.

Figure 3:
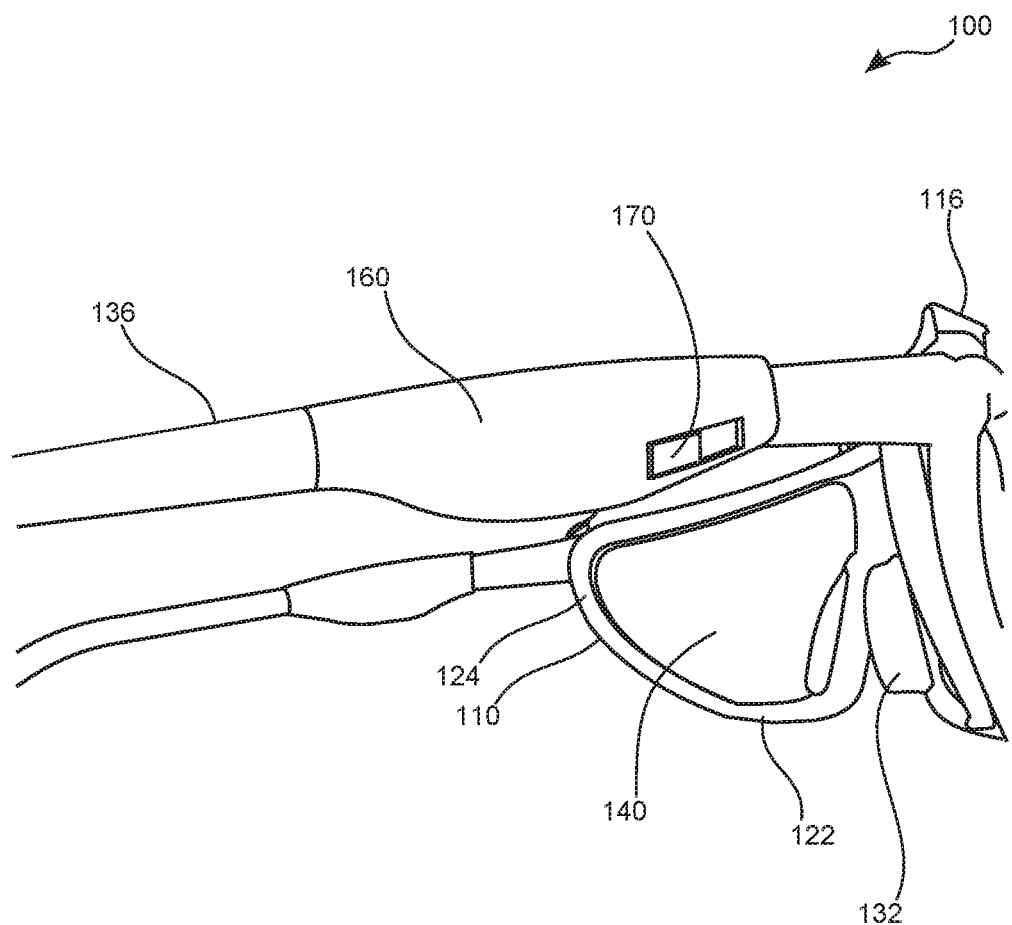
FIG. 3 shows a perspective view illustrating an Improved Pair of Glasses according to an embodiment of the present invention.

Power switch member 170 is adapted such that when two temple portions 122 are pivoted into closed position 172 at least one light member 150 is turned off, and when two temple portions 122 are pivoted into open position 174 at least one light member 150 at least one light member 150 is turned on as shown in FIG. 3. Wherein power switch member 170 is attached to one of the two temple portions 122, is electrically connected to and between power source 160 and at least one light member 150, and is adapted to allow a user 102 to turn on and off said at least one light member 150.

The at least one light member 150, at least one power source 160, and power switch member 170 are water proof, such that improved pair of glasses 100 can be used in the rain and under water. Improved pair of glasses 100 further comprising sensor member 190 attached to main frame 110, is electrically connected to and between power source 160 and power switch member 170, and is adapted to automatically turn on and off power switch member 170, and thereby at least one light member 150, when panel member 194 is in proximity thereto. Panel member 194 is a hood of a welder's mask.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is:

1. An improved pair of glasses comprising:
   a main frame including:
      a top bar portion;
         wherein said top bar portion is adapted to be positioned above and across a pair of eyes of a user;
      two rim portions;
         wherein said two rim portions are attached to a bottom portion of said top bar portion, are spaced from one another, and are adapted to surround respective eyes of said pair of eyes of said user;
      a bridge portion;
         wherein said bridge portion is connected between edge portions of said two rim portions, and is adapted to rest upon a nose of said user;
      two temple portions;
         wherein each of said two temple portions includes an earpiece portion on a distal end thereof adapted to be placed around a respective ear of a user;
         wherein said two temple portions are respectively attached at proximal ends thereof to edge portions of respective said two rim portions;
   two lens members;
      wherein said two lens members are respectively placed within and releasably connected to said two rim portions and adapted to cover said respective eyes of said pair of eyes of said user;
   at least one light member;
      wherein said at least one light member is attached to a top portion of said top bar portion and adapted to shine light in a forward direction of said user;
   at least one power source;
      wherein said at least one power source is attached to said main frame and electrically connected to and adapted to power said at least one light member; and
   a power switch member;
      wherein said power switch member is attached to one of said two temple portions, is electrically connected to and between said power source and said at least one light member, and is adapted to allow a user to turn on and off said at least one light member.

2. The improved pair of glasses of claim 1, wherein said two temple portions are pivotally attached at said proximal ends thereof to said edge portions of said respective said two rim portions.

3. The improved pair of glasses of claim 2, wherein said power switch member is adapted such that when said two temple portions are pivoted into a closed position said at least one light member is turned off, and when said two temple portions are pivoted into an open position said at least one light member is turned on.

4. The improved pair of glasses of claim 1, wherein said at least one light member is formed as a light emitting diode.

5. The improved pair of glasses of claim 4, wherein said at least one light member is formed as a plurality light emitting diodes forming an elongated strip of light emitting diodes.

6. The improved pair of glasses of claim 1, wherein said at least one light member is pivotally and adjustably attached to said top portion of said top bar portion and adapted to shine light in variable forward directions of said user.

7. The improved pair of glasses of claim 1, wherein said at least one light member, said at least one power source, and said power switch member are water proof, such that said improved pair of glasses can be used in the rain and under water.

8. The improved pair of glasses of claim 1, wherein there are two of said at least one light members, are spaced from one another upon said top bar portion, and are located respectively above respective said two rim portions.

9. The improved pair of glasses of claim 8, wherein each of said two light member are formed as a plurality light emitting diodes forming an elongated strip of light emitting diodes.

10. The improved pair of glasses of claim 9, wherein said two light member are pivotally and adjustably attached to said top portion of said top bar portion and each adapted to shine light in variable forward directions of said user.

11. The improved pair of glasses of claim 1, wherein said power source is formed as at least one battery member.

12. The improved pair of glasses of claim 1, further comprising at least one nose pad attached to said bridge portion and adapted to provide padding between said bridge portion and the nose of said user.

13. The improved pair of glasses of claim 1, further comprising two rim pads respectively attached to said two rim portions and adapted to provide padding between each said rim portion and the face of said user.

14. The improved pair of glasses of claim 1, further comprising a dimmer control member attached to one of said two temple portions, is electrically connected to and between said power source and said at least one light member, and is adapted to allow a user to control the brightness of said at least one light member.

15. The improved pair of glasses of claim 1, wherein said main frame and said two lens members are formed from a high impact plastic material.

16. The improved pair of glasses of claim 15, wherein said high impact plastic material is rated to ANSI-Z87-1.2010 standard.

17. The improved pair of glasses of claim 1, wherein said two lens members are formed to have a chosen degree of magnification.

18. The improved pair of glasses of claim 17, further comprising a plurality of pairs of lens members each adapted to be releasably connected to respective said two rim portions, such that said plurality of pairs of lens members are interchangeable; and wherein each pair of said plurality of pairs of lens members are formed having differing degrees of magnification.

19. The improved pair of glasses of claim 1, further comprising a sensor member attached to said main frame, is electrically connected to and between said power source and said power switch member, and is adapted to automatically turn on and off said power switch member, and thereby said at least one light member, when a panel member is in proximity thereto.

20. The improved pair of glasses of claim 19, wherein said panel member is a hood of a welder's mask.

* * * * *